Figure 1:
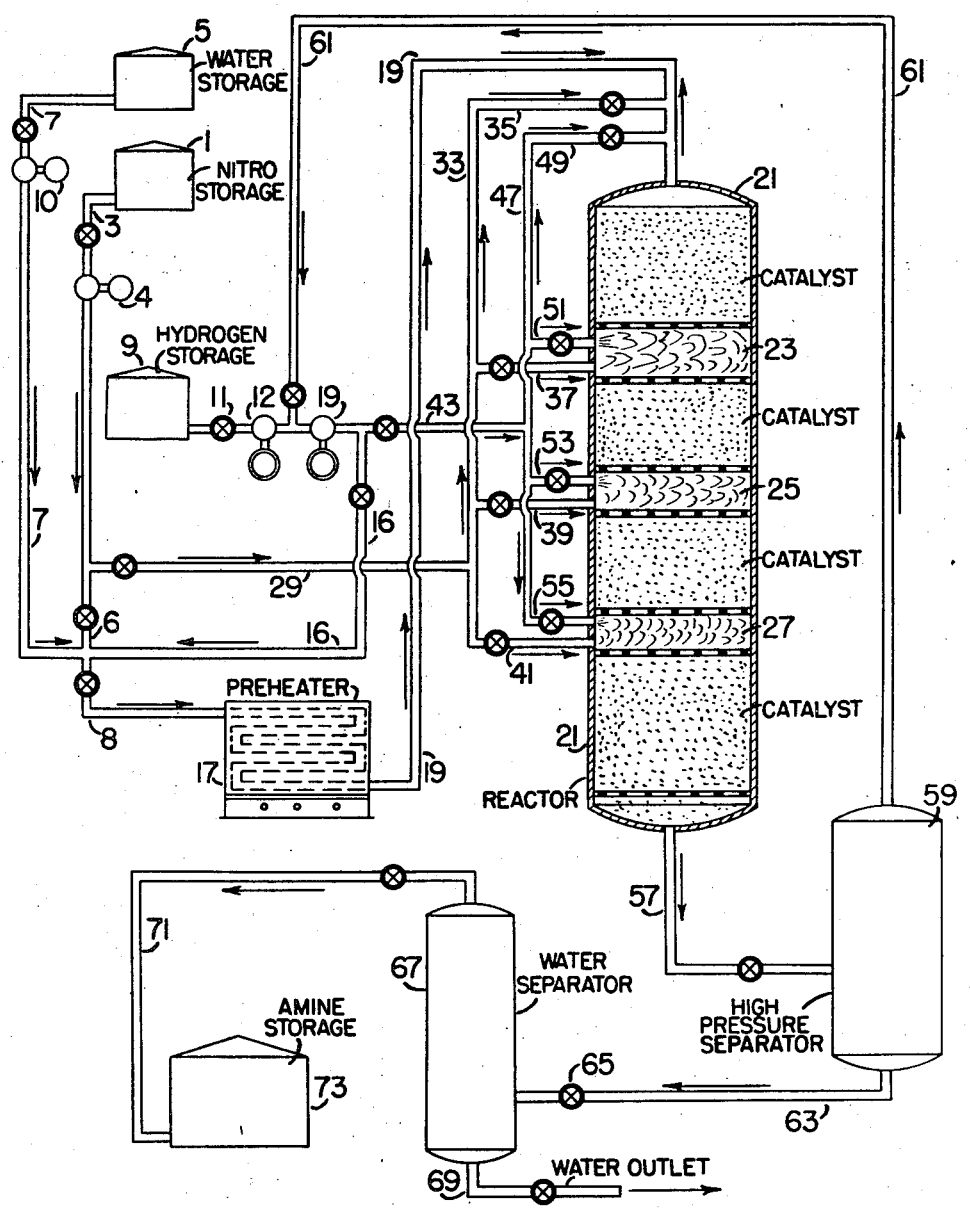

Dec. 9, 1947.  C. L. BROWN  2,432,087

PRODUCTION OF XYLIDENE

Filed Jan. 13, 1944

Cecil L. Brown INVENTOR

BY _____ ATTORNEY

Patented Dec. 9, 1947

2,432,087

UNITED STATES PATENT OFFICE 2,432,087

PRODUCTION OF XYLIDENE

Cecil L. Brown, Baton Rouge, La., assignor to Standard Oil Development Company, a corporation of Delaware Application January 13, 1944, Serial No. 518,049

1 Claim. (Cl. 260—580)

The present invention relates to improvements in the art of producing aromatic amines by reduction of the corresponding nitro amine and more particularly relates to the catalytic process for accomplishing this result.

Recently the aromatic amines have been found to be excellent blending agents or additives in the manufacture of aviation gasoline for they impart to the said gasoline improved performance in high compression engines operating under rich mixture conditions. Prior to my invention, aromatic amines were prepared commercially by batch operations employing iron or tin in conjunction with an acid such as hydrochloric acid. More recently, a continuous process has been developed such as that described in the application of Walter G. Scharmann and Karl J. Nelson, Serial No. 497,354, filed August 4, 1943.

One of the problems involved in continuously reducing aromatic nitro compounds to the corresponding amine is that of dissipating or otherwise controlling the heat of reaction liberated during the reduction of the nitro compound. Since two mols of water are formed during the reduction of each mol of mono nitro aromatic, it will be appreciated that large quantities of heat are released during the reaction. It has heretofore been proposed by others to carry out the reaction in the presence of large quantities of a liquid coolant maintained in the reaction zone. For example, it has been proposed by others to maintain at all times in the reaction zone a body of liquid water sufficiently large to prevent temperature rises above some desired maximum. This feature has been disclosed and claimed in the above Scharmann et al. application.

My present invention in its essence, resides in the concept of continuously reducing aromatic nitro compounds employing a catalyst consisting essentially of molybdenum sulfide or tungsten sulfide supported on charcoal. This catalyst is particularly desirable for liquid phase type of operation, i. e., when a substantial quantity of the aromatic nitro compound is present in the reaction zone in the liquid state, and/or also when liquid water or other liquid coolant is added to the reaction mass. An outstanding and important characteristic of this catalyst is its ability to resist physical disintegration by contact with the liquids which are present in the reaction zone. At the same time, the catalyst possesses good activity.

The main object of my present invention therefore is to provide a catalytic process for bringing about the reduction of aromatic nitro compounds.

Another object of my invention is to devise a process and a suitable catalyst therefor for reducing aromatic nitro compounds in liquid phase in an operation which is more feasible and more economical than those heretofore used.

It is pointed out that my present invention involves as a preferred modification thereof, the accomplishment of continuous hydrogenation of nitro aromatics conducted under closely controlled condition of temperature involving the use of a liquid coolant and more particularly employing a catalyst which is active and which will resist physical disintegration for an extended period of time in a liquid phase type of operation.

In the accompanying drawing, I have shown diagrammatically a form and arrangement of the apparatus elements in which a preferred modification of my invention may be carried into effect.

Referring therefore in detail to the drawing, storage tank 1 contains a mixture of mono nitro xylenes which are to be reduced to the corresponding xylidines. The mixture of nitro xylenes is withdrawn from tank 1 through line 3 by means of pump 4. It is then passed through valved line 6 and mixed with water and hydrogen in line 8. Water is supplied from storage tank 5 through valved line 7 by means of pump 10. Fresh hydrogen is supplied from gas holder 9 and is passed through valved line 11 and compressor 12. The fresh hydrogen is mixed with recycled hydrogen from line 61 and passed through booster pump 18 and valved line 16. The mixture of nitro xylenes, water and hydrogen in line 8 is passed through preheater 17 where it may be heated to the desired temperature. The reactants are then passed through line 19 into the reactor 21.

In the modification I have shown, it will be noted that the catalyst is disposed in the form of four beds with interposed spaces 23, 25 and 27 forming mixing chambers. The temperature within the reactor is maintained below about 500° F. and preferably between about 300 and 450° F. The pressure on the reactor may be from about 1000 to 4000 lbs. per square inch. Pressures in the range above 1500 lbs. are preferred.

The hydrogenation of nitro aromatic compounds is a highly exothermic reaction and means for controlling the temperature in the reactor must be supplied. To this end, means have been provided for supplying cold hydrogen and nitro xylenes to the mixing spaces 23, 25 and 27 in the reactor. Nitro xylenes may be withdrawn through valved line 29 and passed to manifold 33. From manifold 33 the nitro body can be added to the inlet of the reactor and to the mixing zones 23, 25 and 27 through valved lines 35, 37, 39 and 41. Hydrogen is also useful as a cooling material and means are provided to obtain it through valved line 43 and pass it to manifold 47. From manifold 47 cold hydrogen may be supplied to the top of the reactor through valved line 49 as well as to the mixing zones in the reactor through valved lines 51, 53 and 55.

In a preferred modification of my process, water and hydrogen are withdrawn from storage tanks 5 and 9, through lines 7 and 16, mixed in line 8 and heated in preheater 17 to a somewhat higher temperature than is desired in the reactor. The superheated mixture is passed through line 19 and mixed with cold nitro xylenes withdrawn from line 35 so that the resulting mixture is at the desired reaction temperature. Additional cold nitro body may then be added through lines 37, 39 and 41 in mixing zones 23, 25 and 27. If desired, additional hydrogen may also be added to the mixing zones through lines 51, 53 and 55.

The total feed rate for the nitro aromatic compound should be from about 0.1 to 1.0 volume per hour per volume of catalyst in the reactor. The hydrogen should be in excess of that theoretically required and may be from about 3,000 to 12,000 cubic feet per barrel of nitro body feed. The water which is included in the feed is added for the purpose of tempering the reaction and in a preferred modification of my invention I use four volumes of water for each volume of nitro body.

The reaction products are withdrawn from the bottom of reactor 21 through line 57 and then discharged into a high pressure separator 59 from which the hydrogen may be withdrawn through line 61 and recycled for further use in the process. The bottoms from separator 59 are withdrawn through line 63 carrying a pressure reducing valve 65 and discharged into a water separator 67 from which the water may be withdrawn and discharged through line 69 while the amine product is withdrawn through line 71 and delivered to storage drum 73.

I have thus described one method for carrying my invention into effect. For illustrative purposes I have used a feed comprising mono nitro xylenes but it will be understood that the nitro body may contain small amounts of dinitro compounds. The gist of my invention, however, resides in the concept of employing a catalyst which will not be affected by liquid water or any other liquid present in the reaction zone. In place of using water to cool or temper the reaction in reactor 21, I may recycle a portion of the amine product from storage tank 73 or I may employ a hydrocarbon such as xylene or an alkylate or other hydrocarbon fraction. However, it is preferred to use a liquid which will be vaporized to at least some extent under conditions prevailing in the reactor so that part of the heat of reaction is absorbed as latent heat of vaporization.

Some of the catalysts which have been commonly used for the hydrogenation of hydrocarbon oils also have satisfactory activity for the hydrogenation of aromatic nitro compounds. However, in many cases when these catalysts are used in fixed beds for continuous operation in liquid phase or in mixed liquid-vapor phase, the liquid rapidly disintegrates the catalyst forming a powder which can form plugs in lines and valves in various parts of the system. I have found that a catalyst comprising molybdenum sulfide supported on activated charcoal is not only highly active for the hydrogenation of nitro aromatic compounds, but is also very resistant to the disintegrating effects of liquids such as the feed, product or cooling media such as water. Tungsten sulfide on a similar support is also a satisfactory catalyst for this type of operation. The activated charcoal used as the carrier for my catalyst may be of either animal, mineral or vegetable origin. However, charcoal prepared from cocoanut shells, metallurgical coke or petroleum coke are satisfactory carbonaceous supports. The catalyst may contain from about 1 to 20% by weight of molybdenum sulfide on charcoal. However, it is usually preferred to use from about 8 to 10%.

For purposes of illustration I will describe one particular method for the preparation of my catalyst. However, it will be understood that other methods may also be used with good results. Activated charcoal in the form of 4–8 mesh granules and prepared from cocoanut shells was treated in the proportion of 200 lbs. of charcoal to 35 gallons of a solution of ammonium molybdate containing 240 grams per liter of solution. The charcoal was allowed to stand in contact with the solution after which 20 gallons of the solution was withdrawn leaving 15 gallons absorbed on the charcoal. This material was dried and heated to a temperature of 300° F. and then charged to the reactor in which the hydrogenation operation was to be carried out. Hydrogen sulfide was then passed over the catalyst in order to convert the molybdenum to the form of molybdenum sulfide. The catalyst prepared in this manner contained about 8% of molybdenum sulfide.

An alternative method of preparation involves dissolving molybdenum oxide in a solution of ammonium sulfide. The activated charcoal is impregnated with this solution and when the impregnated material is heated, molybdenum sulfide is formed by decomposition on the carrier.

In order to explain and describe my invention further, I set forth below the operating conditions and results of several runs made on a commercial plant scale in the type of apparatus which I have just described.

| Run No. | 1 | 2 | 3 | 4 |
|---|---|---|---|---|
| Hours | 58 | 60 | 60 | 60 |
| Diluent | | | Water | |
| Pressure, p. s. i. | | | 2,700 | |
| Feed Rates, v./v./hour: 1 | | | | |
|   Raw Nitroxylene | 0.41 | 0.45 | 0.44 | 0.42 |
|   Recycle Water | 1.6 | 1.6 | 1.6 | 1.5 |
| Gas Rates, CF/BTF: 3 | | | | |
|   Recycle | 3,610 | 8,930 | 3,840 | 3,840 |
|   Cooling | 3,440 | 1,620 | 3,570 | 2,930 |
| Max. Reactor Temp., ° F | 440 | 445 | 450 | 450 |
| Avg. Reactor Temp., ° F | 410 | 410 | 420 | 420 |
| Carbon Bisulfide Added, Vol. per cent T. F | 0.47 | 0.45 | 0.41 | 0.23 |
| Hydrogen in Recycle Gas, Vol. per cent | 70 | 83 | 82 | 83 |
| Nitroxylene Reduction, per cent | 100 | 100 | 100 | 100 |
| Hydrogen Consumption, CF/B Raw Nitroxylene | 2,850 | | 3,700 | |
| Yield of Xylidine on Crude Nitroxylene Feed: 2 | | | | |
|   (1) By Analysis of Product, Vol. per cent | 77.0 | 81.9 | 78.2 | 81.5 |
|   (2) Per cent of Theoretical | 94 | 99 | 95 | 98 |

In the above table, the abbreviations are identified as follows:
1 v./v./hr.=volume of feed per volume of catalyst.
2 91 wt. per cent nitroxylene, 89 vol. per cent.
3 CF/BTF=cubic feet per barrel of total feed.

It will be noted that in the above table carbon bisulfide was added during the runs. This material is added to maintain the catalyst activity.

In the foregoing runs, the temperatures in the reactor varied from 350° F. to 450° F. This range gives best results, but I have found that I may operate at temperatures from 300° F. to 550° F. However the reaction temperature should not exceed 600° F., since commercial nitroxylene contains polynitro compounds and these compounds may form unwanted decomposition products which contaminate the desired product or even endanger the operators unless the temperatures are maintained within the range indicated. While as disclosed in the foregoing runs, a pressure of 2700 pounds per square inch was used, it will be understood that in the vapor phase type of operation, I may operate at considerably lower pressure, say from atmospheric to 50 pounds per square inch gauge pressure. In runs of the foregoing liquid phase type, the pressures may vary from 1000 to 4000 pounds per square inch.

It is understood that while I have explained in detail the reduction of nitroxylene, the principle of my invention is equally applicable to the production of aniline, toluidine and other aromatic amines by reduction of the corresponding aromatic nitro compound.

Other modifications of my invention than those expressly disclosed will occur to those who are familiar with this art.

What I claim is:

A continuous method for producing xylidine by the catalytic reduction of nitroxylene which comprises continuously feeding nitroxylene, hydrogen and a liquid coolant to a reaction zone containing a hydrogenation catalyst consisting of one of the class of molybdenum sulfide and tungsten sulfide on an activated charcoal carrier, at pressures between 1000 lbs. per sq. in. and 4000 lbs. per sq. in. and at a temperature between 300° F. and 550° F. and continuously removing xylidine from the reaction zone.

CECIL L. BROWN.

REFERENCES CITED

The following references are of record in the file of this patent:

UNITED STATES PATENTS

| Number | Name | Date |
|---|---|---|
| 2,039,259 | Pier | Apr. 28, 1936 |
| 2,131,734 | Henke | Oct. 4, 1938 |
| 2,166,971 | Schmidt | July 25, 1939 |
| 2,198,249 | Henke | Apr. 23, 1940 |